United States Patent
Anderson et al.

(10) Patent No.: US 11,614,159 B2
(45) Date of Patent: Mar. 28, 2023

(54) LUBRICATION DISTRIBUTION SYSTEM

(71) Applicant: Borealis Technical Limited, North Plains, OR (US)

(72) Inventors: Robert W. Anderson, Wichita Falls, TX (US); Yonatan Rotenberg, Miami, FL (US); Shawn Green, Alexandria, MN (US)

(73) Assignee: Borealis Technical Limited, Isle of Man (IM)

( * ) Notice: Subject to any disclaimer, the term of this patent is extended or adjusted under 35 U.S.C. 154(b) by 0 days.

(21) Appl. No.: 17/744,691

(22) Filed: May 15, 2022

(65) Prior Publication Data
US 2022/0364640 A1    Nov. 17, 2022

Related U.S. Application Data

(60) Provisional application No. 63/188,737, filed on May 14, 2021.

(51) Int. Cl.
 *F16H 57/04* (2010.01)
(52) U.S. Cl.
 CPC ..... *F16H 57/0479* (2013.01); *F16H 57/0427* (2013.01); *F16H 57/0434* (2013.01)
(58) Field of Classification Search
 CPC ............. F16H 57/0479; F16H 57/0427; F16H 57/0434
 See application file for complete search history.

(56) References Cited

U.S. PATENT DOCUMENTS

| | | | |
|---|---|---|---|
| 3,893,737 A | 7/1975 | Tyson | |
| 6,223,616 B1 * | 5/2001 | Sheridan | F16H 1/2827 184/6.12 |
| 8,650,980 B2 | 2/2014 | Lafer et al. | |
| 9,291,212 B2 | 3/2016 | Nett et al. | |
| 9,618,034 B2 | 4/2017 | Carter et al. | |
| 10,458,279 B2 | 10/2019 | Gedin et al. | |
| 2010/0263965 A1 * | 10/2010 | Hellenbroich | B60K 6/36 184/6.12 |

* cited by examiner

*Primary Examiner* — Colby M Hansen

(57) ABSTRACT

A lubrication distribution system is provided for mechanical systems, including gearboxes, to evenly and precisely apply lubricant to system structures during operation. The system includes a rotating lubrication distribution component that functions both to pump and to precisely direct lubricant. Machined locator elements enable accurate positioning of the rotating lubrication distribution component within the system. A plurality of lateral ports and surface features in the rotating lubrication distribution component receive and distribute lubricant transferred during rotation from one or more lubricant collection components with profiled lubricant transfer elements that enables collection of lubricant from eddies produced by profiles of the lubricant transfer elements during rotation of the rotating lubrication distribution component. Collected lubricant is directed into the rotating lubrication distribution component ports and distributed evenly and precisely to mechanical system or gearbox structures requiring lubrication. An existing gearbox thrust bearing may be modified to receive and precisely distribute lubricant.

20 Claims, 6 Drawing Sheets

LUBRICATION DISTRIBUTION SYSTEM

TECHNICAL FIELD

The present invention relates generally to systems and methods for lubrication of mechanical systems and specifically to a system and method that ensures optimal and precise distribution of lubricant during operation of a mechanical system with rotating components.

BACKGROUND OF THE INVENTION

Providing a consistent supply of lubricant to component parts of mechanical systems, particularly mechanical systems with rotating components, and ensuring that the lubricant is moved into and through the system so that it is optimally and precisely distributed as required for the mechanical system to function presents challenges. Integrating a pump into an existing mechanical system to move lubricant through the system and make it available for rotating and other system components may not be possible due to design constraints. Further, required clearances and available space in a mechanical system may limit or prohibit the addition or accommodation of a pump or other structure that precisely directs lubricant where needed to moving and other system components. Even if a lubricant pump able to provide an optimal supply of lubricant could be incorporated into an existing mechanical system, such a pump may not be capable of precisely directing lubricant where it is needed. In addition, integrating a pump into an existing mechanical system may not avoid parasitic losses.

Achieving optimal and precise lubrication of mechanical systems with rotating components, for example gearboxes, transmissions, and the like, may present specific challenges. These systems typically require devices for transferring lubricant pumped from a reservoir to lubricating structures, such as rotating seals, that may rotate with the components to be lubricated. Other approaches may involve the use of injectors to spray lubricant from a lubricant circuit to receptacles on a rotating component as the receptacles revolve around the injectors. During rotation, lubricant may be recovered in the receptacles and then directed to a lubricating device for a rotating component. The foregoing systems tend to be relatively complex, however, and may be difficult to install in an existing mechanical system to achieve an optimal lubricant flow or the precise distribution of lubricant.

Rotating seals or spinning seal rings may be used to lubricate mechanical systems with rotating components in aerospace applications. These ring-shaped seals or seal rings may have a plurality of radially spaced openings that collect lubricant and direct the lubricant to other system components. A plurality of openings may be spaced radially within an outer ring wall. These outer openings may be angled to collect lubricant as the ring rotates through a lubricant-containing sump and then move the lubricant into an internal volume or space within the ring. An additional plurality of openings may be spaced radially within an opposed inner ring wall. These inner openings provide exit holes for the lubricant to move out of the ring internal space and to direct the lubricant to the system components to be lubricated as the ring rotates. This arrangement may waste lubricant and may not evenly spread lubricant through the system or precisely direct lubricant to bearings and other structures or rotating components that require lubrication. The volume required to receive lubricant within the seal ring requires the seal ring to have a height that is not optimum, particularly in a mechanical system with tight clearances. This may lead to lubricant slugging, increasing friction during rotation of the seal ring and creating operational problems in a gearbox or other mechanical system with rotating components.

There is a need for a lubrication distribution system for mechanical systems that have rotating components and tight clearances requiring precise application of lubricant and optimal component lubrication during system operation and that prevents fluidic coupling between the rotating components and stationary components in the mechanical system.

SUMMARY OF THE INVENTION

It is an object of the present invention, therefore, to provide a lubrication distribution system for mechanical systems that have rotating components and tight clearances requiring the precise application of lubricant and optimal component lubrication during system operation.

It is another object of the present invention to provide a lubrication distribution system for gearboxes, transmissions, and like mechanical systems with tight clearances and with rotating components and bearings that require the precise application of lubricant and optimal component lubrication during system operation.

It is another object of the present invention to provide a lubrication distribution system to be added to a gearbox that has tight clearances for existing components and minimal space for adding lubricant distribution components that fits within the gearbox to move lubricant smoothly and evenly within the gearbox and precisely lubricates gearbox rotating components during operation and eliminates or reduces fluidic coupling and oil slugging.

It is an additional object of the present invention to provide a gearbox lubrication distribution system with a rotating component and a collection component that may be rotating or fixed and are sized and configured to operate within tight clearance spaces to collect and move lubricant evenly throughout the gearbox and precisely into gearbox areas requiring precision lubrication during gearbox operation.

It is a further object of the present invention to provide a dual function rotating lubrication distribution component for a gearbox lubrication distribution system that is configured to fit within tight clearances and operable to function both to pump lubricant from a lubricant supply and to precisely direct the lubricant to specific locations during gearbox operation.

It is a further object of the present invention to provide at least one lubricant collection component for a gearbox lubrication distribution system integrally formed with or attached to a gearbox structure that may rotate at a different speed or may be stationary and that functions in concert with a dual function rotating lubricant distribution component during gearbox operation to collect and direct lubricant into the dual function rotating lubrication distribution component.

It is a further object of the present invention to provide a plurality of lubricant collection components for a gearbox lubrication distribution system that function as a windage tray integral with the gearbox lubrication distribution system and eliminate the need for a separate windage tray element to maintain a cohesive lubricant sump in a gearbox.

It is yet a further object of the present invention to provide a method for moving lubricant and precisely directing lubricant within gearboxes, transmissions, and like mechanical systems with rotating components and tight clearances during system operation that achieves and maintains optimal and precise lubrication of these mechanical systems.

In accordance with foregoing objects, a lubrication distribution system is provided for mechanical systems with rotating components and tight clearances, including gearboxes, transmissions, and like mechanical systems, that distributes lubricant optimally and evenly and precisely applies lubricant to rotating and other system structures during system operation. The lubrication distribution system of the present invention may be based on an existing mechanical system component or, alternatively, may be added to an existing mechanical system. Advantageously, the lubrication system includes a rotating lubricant distribution component and a lubricant collection component that may rotate at a different speed relative to the rotational speed of the rotating lubrication distribution component. The rotating lubrication distribution component may be formed from a thrust bearing element with a ring-shaped disc configuration already resident in a gearbox or other mechanical system modified as described herein to function dually as a lubricant pump and a thrust bearing. A separate ring-shaped disc element may be modified to form the rotating lubrication distribution component, and this modified disc element may be added to a mechanical system that does not already have a thrust bearing with a ring-shaped disc configuration. Extendible locator tabs may be defined at spaced locations in the ring-shaped disc to position and fit the ring-shaped disc in a gearbox or other mechanical system. Lateral openings or ports formed at other spaced locations in the ring-shaped disc may be configured to pump lubricant through the ports as the ring-shaped disc rotates in clockwise and in counter-clockwise directions during operation of the mechanical system.

The lubricant collection component may be mounted in one or more fixed locations on a structure in a gearbox or mechanical system so that a surface of the lubricant collection component is in wiping contact with a surface of the rotating lubrication distribution component during rotation. A plurality of individual lubricant collection components may be mounted in spaced locations on the gearbox or other mechanical structure that maintain lubricant in a sump portion of the system. The lubricant collection component may be configured to collect lubricant from lubricant eddies created adjacent to sections of the lubricant collection component as the rotating lubrication distribution component rotates clockwise and/or counter-clockwise over the lubricant collection component. Lubricant collected from the created lubricant eddies is directed into the lateral ports in the rotating lubrication distribution component for distribution to gearbox or other mechanical system components.

The present invention additionally provides a method that collects and distributes lubricant within a gearbox or other mechanical system using the aforementioned rotating lubrication distribution component and lubricant collection component to ensure that the mechanical system is smoothly and evenly lubricated and that lubricant is precisely directed to system components to be lubricated while reducing or eliminating fluidic coupling between components in the gearbox or other mechanical system.

Other objects and advantages will be apparent from the following description, claims, and drawings.

DESCRIPTION OF THE INVENTION

The lubrication distribution system of the present invention is designed to move lubricant smoothly and evenly through mechanical systems with rotating and other components that have tight clearances and little, if any, space to accommodate added structures for lubrication distribution. Components of the present system should fit within available tight clearances of a mechanical system and may be designed to be formed from existing system components that have been modified as described herein. The components may also be separate structures added to the system. While the lubrication distribution system of the present invention will be described in a gearbox application, it is contemplated that the present lubrication distribution system may also be effectively employed with other mechanical systems that have rotating components requiring precise lubrication.

The terms "lubricant" and "oil" are used interchangeably to refer to fluids used as lubricants. The term "lubrication distribution system" as used herein refers to systems that move these fluids through gearboxes and similar mechanical systems with rotating components in accordance with the present invention. In most of these systems, the lubricant used will be a lubricating oil typically used for this purpose. Other fluid lubricants, including those not made from oil, may also be used in some mechanical systems. Preferred lubricants are capable of maintaining a proper viscosity to form a stable film at a specified temperature and speed of operation for the mechanical system.

Figure 1:
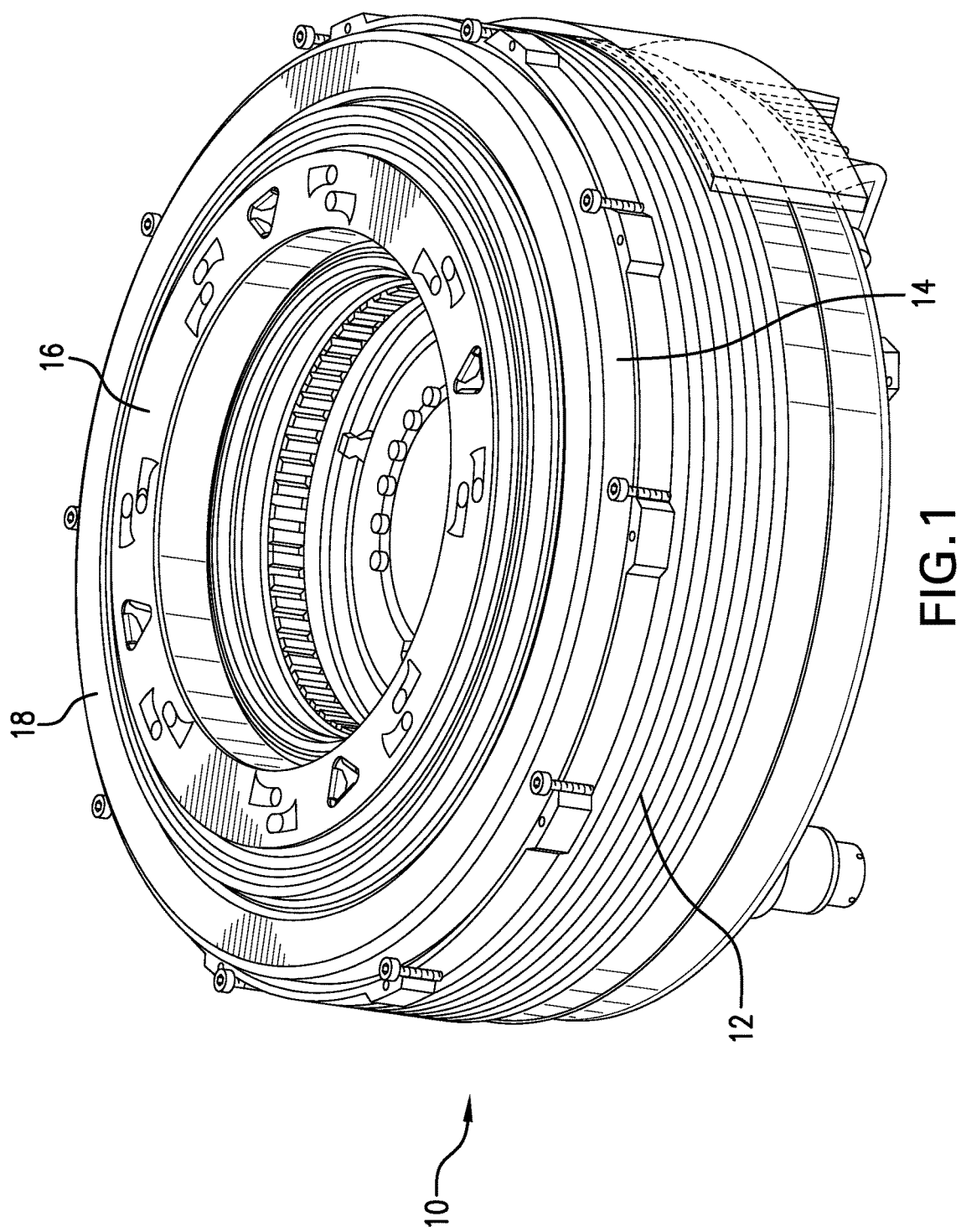
FIG. 1 is a perspective view of a gearbox and is representative of a mechanical system with rotating components with which the lubrication distribution system of the present invention may be used.

The drawings, which may not be drawn to scale, show features of a lubrication distribution system functionally structured according to the present invention for mounting in a gearbox. As noted, the present lubrication distribution system may be adapted and used to distribute lubrication in other mechanical systems that have rotating components. FIG. 1 shows a perspective view of a gearbox 10 that has at least planet gears and a planet carrier. The gearbox 10 may be used to transfer torque through an electric or other kind of motor or in another torque transfer application. The gearbox 10 has a housing 12 with a housing cover 14. A rotating lubrication distribution component 16 is positioned adjacent to and within an outer surface 18 of the gearbox housing and may be held in place within the gearbox by the housing cover 14 and/or by structures that may be integral to the rotating lubrication distribution component. The rotating lubrication distribution component 16 may have the configuration of a ring-shaped disc. The structure and function of the rotating lubrication distribution component 16 is discussed in more detail in connection with FIGS. 3A, 3B 4, and 6. Additionally, the rotating lubrication distribution component 16 may be a thrust bearing already resident in the gearbox 10 that has been modified as described below and shown in the drawings. The terms "lubrication distribution component" and "ring-shaped disc" are used interchangeably herein to refer to the rotating lubrication distribution component 16. This structure may function as a thrust bearing in a gearbox or other mechanical system.

Figure 2:
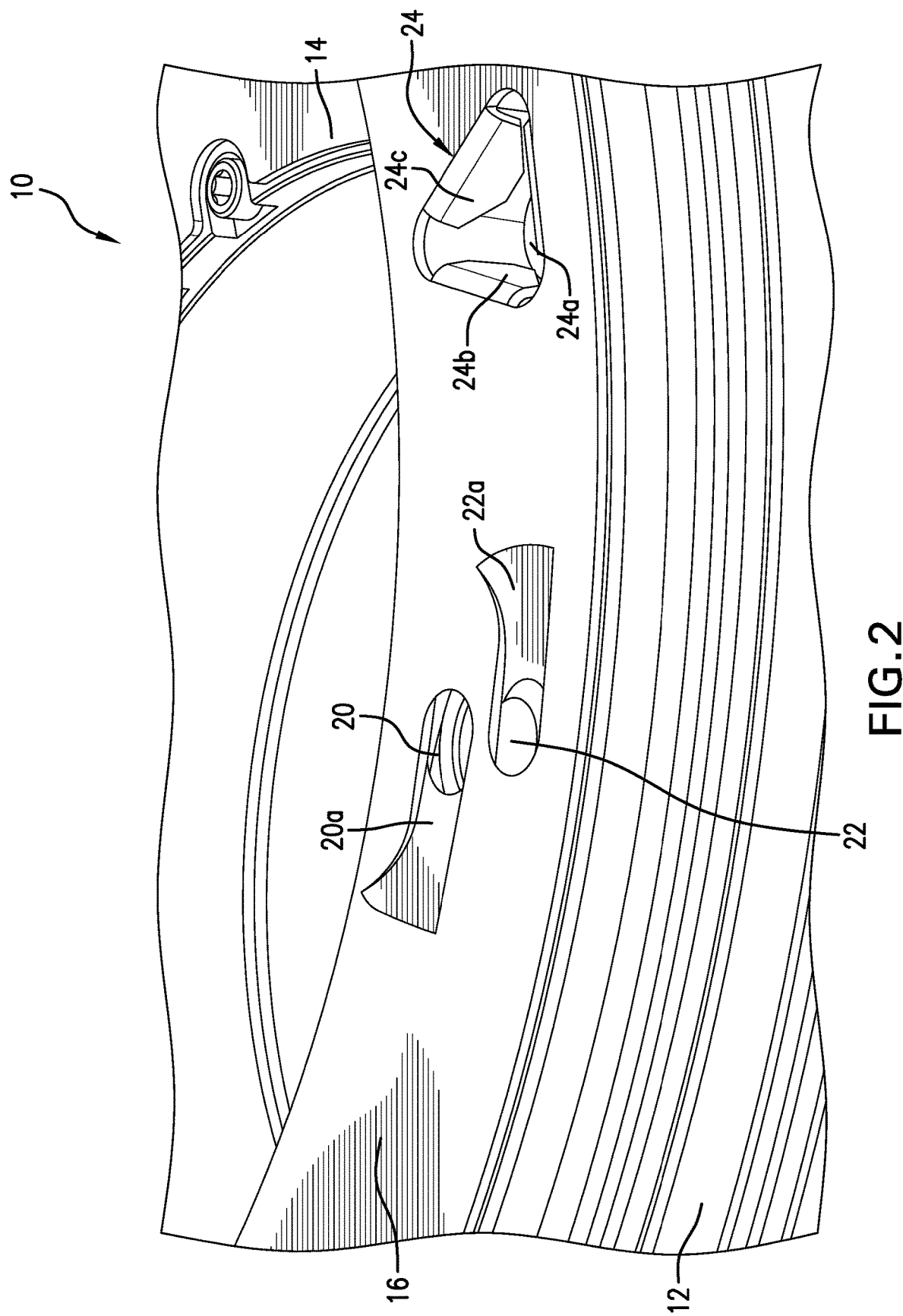
FIG. 2 is an enlarged view of a section of the gearbox of FIG. 1 showing a portion of a rotating lubrication distribution component of the lubrication distribution system of the present invention.

FIG. 2 shows an enlarged view of a portion of a rotating lubrication distribution component or ring-shaped disc 16 within a gearbox housing 12, where the ring-shaped disc may be held in place by a housing cover 14. Visible in FIG. 2 are structural modifications that may be made to the ring-shaped disc 16 that enable the disc to function as a lubricant pump and that may be used to position and fit the ring-shaped disc within the gearbox 10. When a ring-shaped disc, such as the ring-shaped disc 16, is already being used as a thrust bearing element in the gearbox, modifications described herein may enable dual function of the ring-shaped disc as both a thrust bearing and a lubrication pump. It is no longer necessary to wait for or rely on the gears in a gearbox or rotating structures in a similar mechanical system to pick up and move lubricant around the system. In accordance with the present invention, a rotating lubrication distribution component 16 and a plurality of lateral openings, such as ports 20 and 22 formed in the rotating lubrication distribution component 16, in combination with other features and a lubricant collection component 30 (FIGS. 4, 5, and 6), pick up lubricant and direct the lubricant where it is needed within the mechanical system. The ports 20 and 22, which will be described in more detail below, enable the lubricant distribution component 16 both to pump lubricant onto the ring-shaped disc surface and to focus and direct sprays of lubricant to specific areas to be lubricated. Surface modification of the lubricant distribution component with structures other than those shown in the drawings may be required to focus and direct lubricant sprays precisely. As noted, the modified ring-shaped disc 16 may also function as a thrust bearing for a gearbox or another mechanical system. Locations and configurations of the openings in the rotating lubrication distribution component or ring-shaped disc 16 may be selected to target lubricant distribution to selected locations within the gearbox or other mechanical system.

Figure 3A:
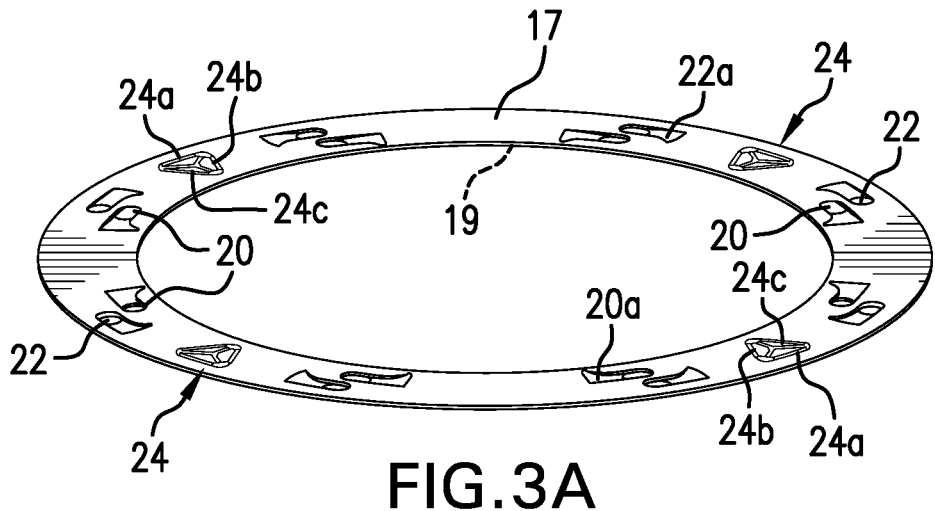
FIG. 3A is a perspective view of a rotating lubrication distribution component of the present lubrication distribution system, as machined, showing lateral lubricant ports and ramps and defining locator tabs.
Figure 3B:
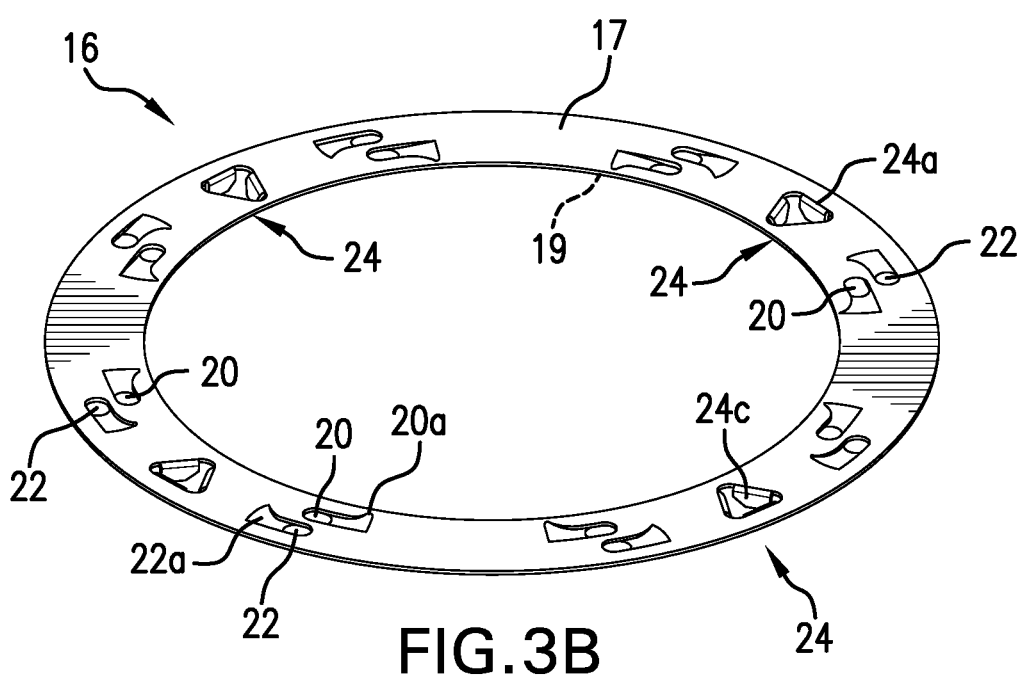
FIG. 3B is a perspective view of an upper surface of the machined rotating lubrication distribution component of FIG. 3A with the defined locator tabs extended below the upper surface to enable positioning and fit of the rotating lubrication distribution component within a gearbox or other mechanical system.

FIGS. 3A and 3B illustrate different views of an upper or outer surface of the rotating lubrication distribution component or ring-shaped disc 16. FIG. 3A is a perspective view of a rotating lubrication distribution component of the present lubrication distribution system, as machined, and shows an upper surface 17 that is located adjacent to, and held in place by, the housing cover 14 (FIGS. 1 and 2), and an opposite lower surface 19. In a gearbox, surface 19 may be oriented toward the gearbox interior and adjacent to gearbox structures, such as a planet carrier or planet gears (not shown). The lateral openings or ports 20 and 22, which extend through the thickness of the ring-shaped disc 16, may be formed with or without ramps and may be positioned and configured to direct lubricant picked during rotation in a desired direction. FIGS. 3A and 3B show respective ramp structures 20a and 22a associated with each pair of openings 20 and 22 oriented in opposite directions; however, the ramp structures may be oriented in the same direction or omitted entirely. In addition, the numbers of the ports 20 and 22 may vary from what is shown, and a single opening rather than two paired openings, as well as greater or lesser numbers of openings than those shown may be provided. If two lateral openings are used for optimal lubricant distribution, they may be staggered rather than paired as shown. While it is preferred to provide a number of ports that are spaced laterally about the circumference of the ring-shaped disc 16, the specific number and spacing may vary for a particular mechanical system application. Surface modifications other than the ramps shown may be made adjacent to the ports 20 and 22 to produce structures or features that will precisely direct lubricant to specific locations and structures within a gearbox or other mechanical system.

Tab elements 24, which are defined in surface 17 of the machined rotating disc 16 shown in FIG. 3A, advantageously have a triangular shape cut to form three locator tabs (24a, 24b, and 24c) for each tab element that may be folded to extend through the lower surface 19 of the rotating disc 16. Other shapes may be employed to position and fit a rotating disc in a specific mechanical system. The locator tabs are shown in these extended positions in FIGS. 3B and 4. The locator tabs 24a, 24b, and 24c may be used as anti-rotation devices to position and affix the ring-shaped disc 16 to a non-rotating structure in a gearbox or other mechanical system. The locator tabs may position the ring-shaped disc so that features in the ring-shaped disc cover the gearbox or other mechanical system. The locator tabs 24a, 24b, and 24c of the tab elements 24 may be specifically configured to extend into negative space within the gearbox to prevent a gearbox from rotating with the ring-shaped disc 16. It is contemplated that the locator tabs and tab elements may be replaced by any integral or non-integral device or structure that maintains no differential speed of the rotating lubrication distribution component 16 compared to the rotational speed of the gearbox or other mechanical system.

The height or thickness of the rotating lubrication distribution component or ring-shaped disc 16 will depend on space available in the gearbox or other mechanical system and may be tolerance controlled to complement height of the overall assembly. The overall assembly height may include the height of the ring-shaped disc 16 and the distance of an air gap (not shown) between the ring-shaped disc 16 and its corresponding mating or controlling face in the gearbox housing 12, such as housing cover 14 or another adjacent gearbox or system structure.

The rotating lubrication distribution component 16 of the present invention may be used in gearboxes and other mechanical systems with tight clearances where occurrences of lubricant or oil slugging may increase friction and otherwise interfere with operation of the systems. An optimal air gap distance advantageously maintains the lubricant at an optimal viscosity for the gearbox or other mechanical system to reduce and/or eliminate fluidic coupling and oil slugging.

The rotating lubrication distribution component 16 may be formed from a material that is appropriate for the temperature and rotational speed requirements of the gearbox or other mechanical system in which it will be used. Materials forming the rotating lubrication distribution components of the present invention should be durable for the specific mechanical system application and may include, for example without limitation, metals and nylon. It is contemplated that the lubrication distribution component 16 and the lubricant collection component may also be formed from other suitable materials.

Figure 4:
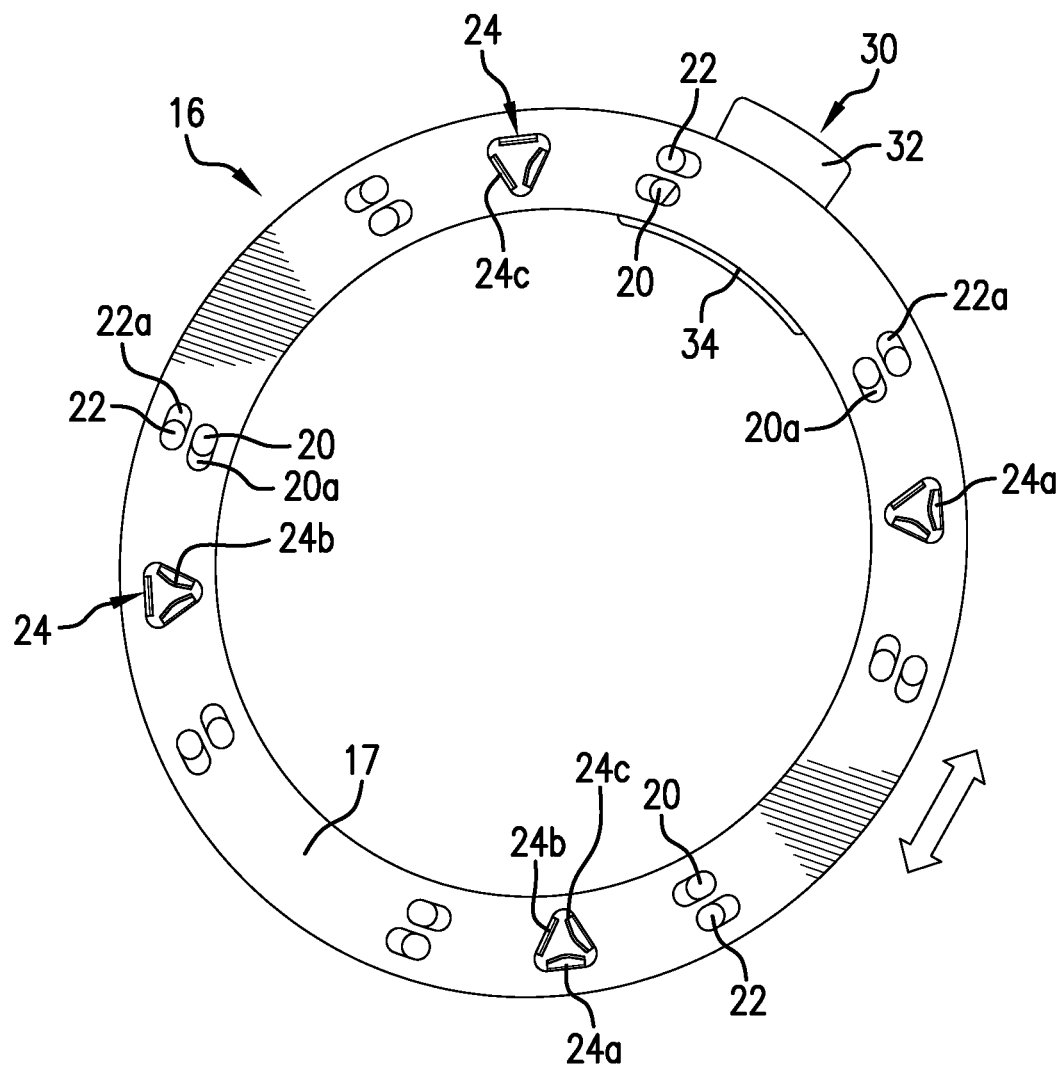
FIG. 4 is a plan view of the upper surface of the rotating lubrication distribution component of FIG. 3B, showing a relative location of a lubricant collection component to lateral lubricant ports of the rotating lubricant distribution component of the present lubrication distribution system.

FIG. 4 illustrates the rotating lubrication distribution component or ring-shaped disc 16 and the lubricant collection component 30 of the present invention in one relative arrangement as they would appear not installed within a gearbox or other mechanical system housing. Only a single lubricant collection component 30 is shown. It is contemplated that multiple lubricant collection components may be spaced circumferentially to contact multiple areas of the ring-shaped disc 16 inner surface 19 during operation of the lubrication distribution system. The circumferential spacing of multiple lubricant collection components 30 may position each of the lubricant collection components in locations selected to maintain lubricant or oil in a sump portion of the gearbox or other mechanical system. When multiple lubrication collection components 30 are optimally spaced in selected locations about the circumference of the ring-shaped disc 16, the multiple lubricant collection components may function as an integral windage tray that maintains the oil within a gearbox sump. When oil is cohesively maintained in the sump portion of the gearbox, the oil remains in the sump and does not move upwards or climb up the side of the gearbox, where it may slug and create foam. This function of optimally spaced multiple lubricant collection components may eliminate the need for the separate windage tray element currently added to a gearbox to maintain a cohesive oil sump. The specific number of the multiple lubricant collection components 30 and the optimal spacing and circumferential locations of these multiple lubricant collection components may vary for different gearboxes and other mechanical systems.

FIG. 4 also illustrates a top view of the defined tab elements 24 with the triangular shape described above. The individual locator tabs 24a, 24b, and 24c are shown extended away from the surface 17 of the ring-shaped disc 16.

The lubricant collection component 30 may also be referred to as a wiper pad, and these terms are used interchangeably herein. Each of the wiper pads 30 contacts an area of the of the inner surface 19 of the ring-shaped disc 16 as the disc rotates in a clockwise direction or in a counter-clockwise direction. The wiper pad or lubricant collection component 30 may be fixed to a gearbox structure, such as the housing cover 14. An attachment portion 32 may secure the wiper pad 30 to the housing cover 14 by an appropriate fastening method or structure. A lubricant distribution contact portion 34 of the lubricant collection component 30 may be positioned perpendicularly to the attachment portion so that a contact surface 36 is in wiping contact with the inner surface 19 of the rotating lubrication distribution component 16. Alternatively, the lubricant collection component 30 may be machined or otherwise formed integrally with the housing cover 14 or another fixed gearbox structure that will position this component in wiping contact with the inner surface 19 of the rotating lubrication distribution component 16 during rotation within the gearbox or other mechanical system.

Figure 5:
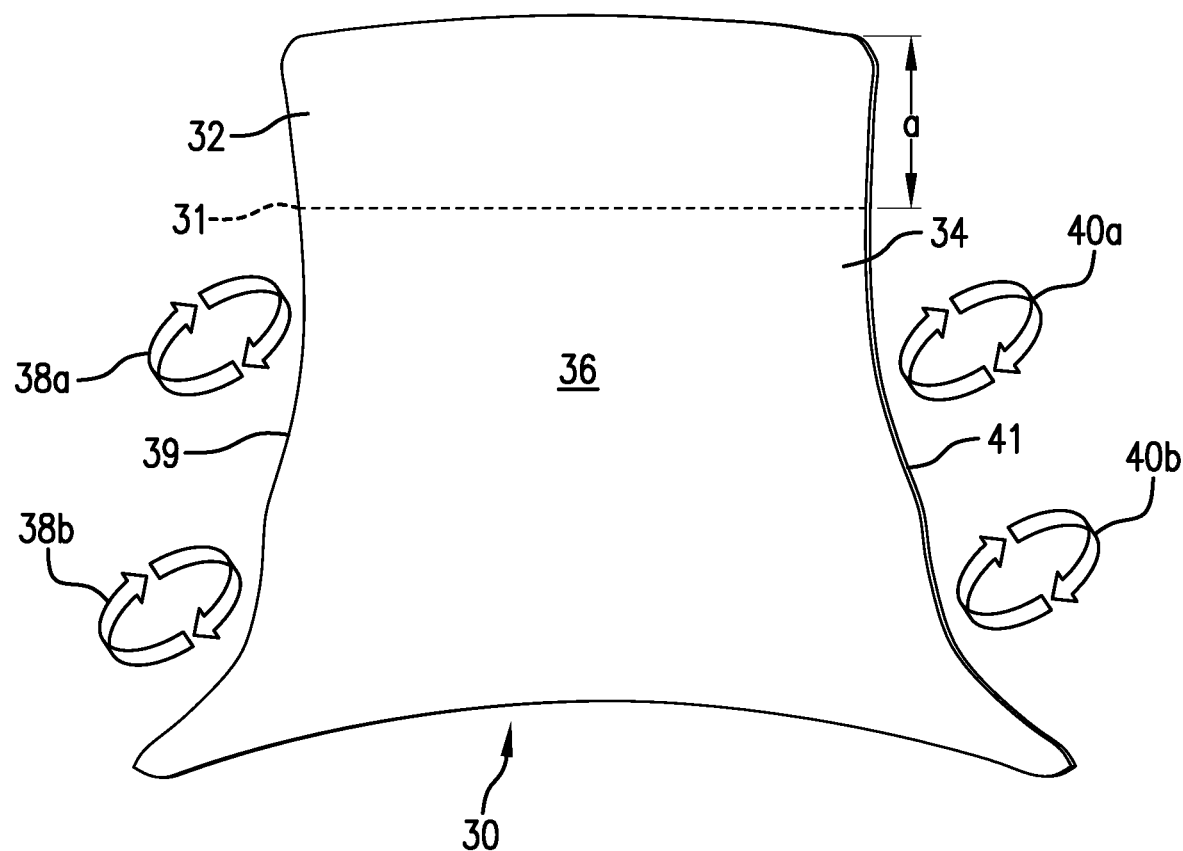
FIG. 5 is a plan view of one embodiment and configuration of a lubricant collection component of the lubrication system of the present invention.

FIG. 5 illustrates one embodiment and possible configuration of the lubricant collection component 30, which is shown as a unitary structure. A dashed line 31 indicates where the unitary structure might be bent or folded for attachment to the housing cover 14 or other fixed structure so that the surface 36 may be positioned as required to contact the ring-shaped disc 16 inner surface 19. If the lubricant collection component 30 is to be machined with or otherwise formed integrally with a gearbox housing cover 14 or a different fixed gearbox element, the housing cover or other fixed element may be formed to have a desired number of spaced structures corresponding to the configuration shown for component 30 or to another appropriate configuration for the gearbox or other mechanical system. An attachment portion 32 may not be needed in this case. If the lubricant collection component 30 is a separate element that must be attached to the gearbox, the attachment portion may have a height, indicated by line a, and this may vary for different gearboxes and other mechanical systems.

The wiping surface 36 of the contact portion 34 of the lubricant collection component 30 may be more clearly seen in FIG. 5. As noted above, the wiping surface 36 contacts surface 19 of the ring-shaped disc 16. The circular arrows 38a and 38b represent, respectively, outer and inner oil collection eddies formed adjacent to an edge 39 of the lubricant collection component 30 when the rotating lubrication distribution component 16 is rotating in a clockwise direction. The circular arrows 40a and 40b represent, respectively, outer and inner oil collection eddies formed adjacent to an edge 41 opposite edge 39 of the lubricant collection component 30 when the rotating lubrication distribution component 16 is rotating in a counter-clockwise direction. These eddies are produced during rotation of the rotating lubrication distribution component 16, and the oil collected is pumped to the outer surface 17 of the ring-shaped disc 16 through the lateral ports 20 and 22 during rotation. As noted, it is contemplated that the lubricant collection component 30 may have other shapes and/or configurations than that shown in the drawings. The profiles of the opposed edges 39 and 41 may be varied as required to maximize lubricant collection eddies in locations corresponding to positions of the lateral ports in the rotating lubrication distribution component 16.

Figure 6:
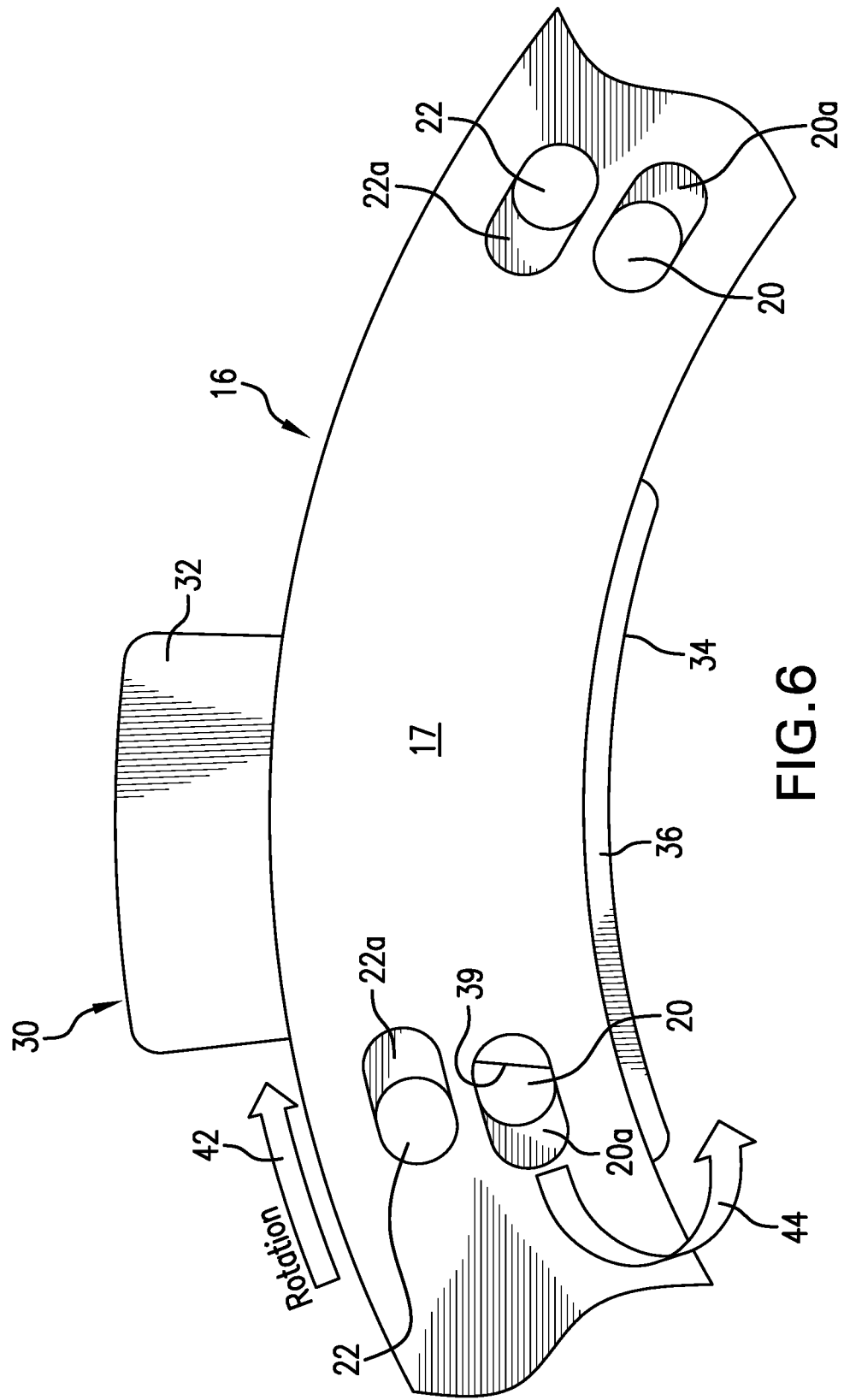
FIG. 6 shows a portion of a rotating lubrication distribution component positioned relative to a lubricant collection component during a clockwise rotation of the rotating lubrication distribution component while the present lubrication distribution system is in operation.

FIG. 6 shows an enlarged view of a portion of the combined rotating lubrication distribution component or ring-shaped disc 16 with one of the lubricant collection components or wiper pads 30 positioned in contact with the ring-shaped disc, as illustrated in FIG. 4. As noted, multiple ones of the wiper pads 30 may be provided and arranged circumferentially to contact the ring-shaped disc 16 during operation of the gearbox or other mechanical system. During operation of a gearbox with this arrangement, the ring-shaped disc 16 is shown rotating in a clockwise direction, as designated by the arrow 42, within the gearbox housing 14 (FIGS. 1 and 2). As discussed in connection with FIG. 5, eddies 38a and 38b of oil or another lubricant are formed adjacent to edge 39 of the contact portion 34 of the wiper pad 30 when the ring-shaped disc 16 is rotating in the clockwise direction. As indicated by the arrow 44, oil may be harvested from a corresponding eddy through one or both of the lateral ports 20 and 22 when the inner surface 19 of the ring-shaped disc 16 contacts and rubs against the contact surface 36 of the wiper pad 30. Advantageously, collected oil is pumped and directed onto the outer surface 17 of the rotating lubrication distribution component 16. This may be done with or without ramps 20a and 22a (FIG. 3B) or other fluid-directing structure formed within the thickness of the rotating lubrication distribution component 16 at each port 20 and 22. During operation, the rotating lubrication distribution component 16 functions in concert with the lubricant collection component 30 both to collect oil and to pump oil to the rotating lubrication distribution component 16 in its role as a thrust bearing and to pump and direct oil through the lateral ports (20, 22) and other suitable features (not shown) on the rotating lubrication distribution component to lubricate other gearbox structures. It is contemplated that such suitable features may be cut into surfaces 17 and/or 19 of the rotating lubrication distribution component 16, and that these features may be configured and positioned to direct oil to specific parts of a gearbox. It is also contemplated that other features may be added to the rotating lubrication distribution component 16 to locate or position the rotating lubrication distribution component at specific locations where the collection of oil and the direction of oil into precise areas are facilitated. As noted above, multiple ones of the lubricant collection components 30 may be optimally spaced in selected circumferential locations relative to the rotating lubrication distribution component 16 so that oil is cohesively maintained within the gearbox sump while it is collected during gearbox operation as described.

While the present invention has been described with respect to preferred embodiments, this is not intended to be limiting, and other equivalent arrangements and structures that perform the required functions are contemplated to be within the scope of the present invention.

INDUSTRIAL APPLICABILITY

The lubrication distribution system of the present invention will find its primary applicability where it is desired to provide precise and optimal lubrication for mechanical systems with rotating structures, in particular providing precise and optimal lubrication in gearboxes with tight clearances using modified rotating gearbox structures to collect and distribute lubricant to gearbox components while maintaining a cohesive lubricant supply within the mechanical system or gearbox sump.

The invention claimed is:

1. A lubrication distribution system for a mechanical system with rotating components and tight clearances, comprising:
   a. a mechanical system having rotating components in fluid communication with a supply of lubricant;
   b. a rotating lubrication distribution component positioned and dimensioned to fit within clearances of a circumferential housing in said mechanical system and comprising a ring-shaped disc having a plurality of circumferentially spaced openings shaped to receive and direct lubricant through said openings from an inner surface to an outer surface of said ring-shaped disc and at least one tab element configured to position and fix said ring-shaped disc in said mechanical system housing; and
   c. one or more lubricant collection components positioned at locations relative to said circumferential housing with a surface of each of said one or multiple lubricant collection components in wiping contact with a corresponding surface of said ring-shaped disc, wherein edges of said multiple lubricant collection components have profiles configured to collect lubricant from said supply of lubricant and direct said collected lubricant to said circumferentially spaced openings in said ring-shaped disc.

2. The lubrication distribution system of claim 1, wherein each of said plurality of circumferentially spaced openings comprises a pair of laterally positioned ports, each of said ports being adjacent to a lubricant ramp structure formed in said rotating lubrication distribution component upper surface.

3. The lubrication distribution system of claim 2, wherein each said lubricant ramp structure is formed to direct lubricant from one of said ports in an identified direction.

4. The lubrication distribution system of claim 1, wherein said at least one tab element comprises multiple circumferentially spaced tab elements formed in said rotating lubrication distribution component, each said tab element formed to have one or more locator tabs extendible toward said inner surface to position and fix said rotating lubrication distribution component within said circumferential housing.

5. The lubrication distribution system of claim 4, wherein said tab elements have a triangular configuration, and each of said one or more locator tabs extends from a side of said triangle toward said inner surface.

6. The lubrication distribution system of claim 1, wherein each of said one or more lubricant collection components comprises a wiper pad element fixedly positioned at a spaced location on said circumferential housing, each said wiper pad element comprising a rotating lubrication distribution component contact portion with a contact surface in wiping contact with said inner surface and an attachment portion fixed at said spaced location, wherein said contact portion is oriented perpendicularly to said attachment portion.

7. The lubrication distribution system of claim 6, wherein said edges of said multiple lubricant collection components and said profiles are configured to produce eddy currents in said supply of lubricant and move lubricant to said rotating lubrication distribution component upper surface.

8. The lubrication distribution system of claim 6, wherein each of said wiper pad elements is formed integrally with a component of said circumferential housing or each of said wiper pad elements is formed as a separate structure attached to said circumferential housing.

9. The lubrication distribution system of claim 1, wherein said one or more lubricant collection components are fixed at spaced locations within said circumferential housing selected to maintain a cohesive supply of lubricant within a sump portion of said mechanical system.

10. The lubrication distribution system of claim 1, wherein said one or more lubricant collection components are positioned to rotate at a speed different from a rotational speed of said rotating lubrication distribution component.

11. The lubrication distribution system of claim 1, wherein said mechanical system comprises a gearbox and said rotating lubrication distribution component comprises a thrust bearing element resident in and rotationally mounted within a housing of said gearbox, and said plurality of circumferentially spaced openings in said thrust bearing element extend from an inner surface to an outer surface of said thrust bearing element.

12. The lubrication distribution system of claim 1, wherein said rotating lubrication distribution component further comprises a plurality of circumferentially spaced lubricant distribution elements associated with said openings configured and positioned to precisely direct lubricant at specific mechanical system components.

13. A method for evenly and precisely distributing lubricant to rotating components of a mechanical system, comprising:
   a. in a mechanical system with rotating components in a circumferential housing, a sump, and a supply of lubricant, providing a rotating lubrication distribution component having integrally formed locator elements with extendible locator tabs and a plurality of lateral ports extending between a rotating lubrication distribution component inner surface and outer surface, and providing one or more lubricant collection components having profiled lubricant transfer elements in lubricant transfer contact with the rotating lubrication distribution component;

b. fixing the one or more lubricant collection components at spaced locations within the circumferential housing in fluid communication with the supply of lubricant, the locations being selected to maintain a cohesive supply of lubricant within the sump and locating and positioning the rotating lubrication distribution component within the circumferential housing with the extendible locator tabs so that the inner surface is in lubricant transfer contact with profiled lubricant transfer elements;

c. during operation of the mechanical system, rotating the rotating lubrication distribution system in a clockwise or counter-clockwise direction so that the plurality of lateral ports contact surfaces of the profiled lubricant transfer elements and profiles on opposed edges of the lubricant transfer elements cause lubricant from the supply of lubricant to form collection eddies;

d. directing lubricant from the collection eddies through openings in the plurality of lateral ports when direction of rotation of the rotating lubrication distribution component aligns the openings with the collection eddies; and e. moving the directed lubricant to the outer surface of the rotating lubrication distribution component during rotation and further directing lubricant from each of the plurality of lateral ports to specific rotating structures in the mechanical system.

14. The method of claim 13, wherein the mechanical system comprises a gearbox, the rotating lubrication distribution component comprises a ring-shaped thrust bearing, the plurality of lateral ports are configured to direct lubricant to a specific gearbox location, each of the profiled lubricant transfer elements comprises a wiper pad having opposed edge profiles that promote formation of collection eddies during rotation of the thrust bearing, and further comprising moving lubricant from the collection eddies through the thrust bearing from the inner surface to the outer surface as the openings align with the collection eddies during rotation, and directing lubricant from the thrust bearing upper surface to the specific gearbox location.

15. The method of claim 14, further comprising modifying the openings in the upper surface of the thrust bearing to direct lubrication to a planet carrier and planet gears in the gearbox, and directing the lubricant from the modified openings precisely to the planet carrier and planet gears during rotation of the thrust bearing.

16. The method of claim 14, further comprising attaching multiple profiled lubricant transfer elements at multiple spaced locations on a component of the gearbox and positioning a contact surface of each profiled lubricant transfer element in a location that contacts the inner surface of the thrust bearing during rotation of the thrust bearing.

17. The method of claim 16, further comprising attaching each of the multiple profiled lubricant transfer elements in spaced locations selected to maintain a cohesive supply of the lubricant within a sump portion of the gearbox.

18. The method of claim 17, further comprising angularly spacing each of the multiple profiled lubricant transfer elements relative to a circumference of the ring-shaped thrust bearing.

19. The method of claim 13, wherein a profile on one opposed edge of the lubricant transfer elements causes lubricant from the supply of lubricant to form collection eddies and transfer lubricant when the rotating lubrication distribution component is rotated in a clockwise direction and a profile on the other opposed edge of the lubricant transfer elements causes lubricant from the supply of lubricant to form collection eddies and transfer lubricant when the rotating lubrication distribution component is rotated in a counter-clockwise direction.

20. The method of claim 13, further comprising positioning the one or more lubricant collection components to rotate at a speed different from a rotational speed of the rotating lubrication distribution component.

* * * * *